Patented Apr. 7, 1953

2,634,281

UNITED STATES PATENT OFFICE 2,634,281

ORGANO-TIN SULFONAMIDES

Gerry P. Mack, Jackson Heights, and Emery Parker, New York, N. Y., assignors to Advance Solvents & Chemical Corporation, New York, N. Y.

No Drawing. Original application August 9, 1949, Serial No. 109,408. Divided and this application August 1, 1950, Serial No. 177,126

2 Claims. (Cl. 260—429)

The invention is a division of our application, Serial No. 109,408 and relates to new organo-tin compounds.

The new compounds are organo-tin sulfonamides of the general formula $$R_mSn(R'NO_2SR'')_n$$

wherein R represents an alkyl radical having 1 to 12 carbon atoms or an aryl radical, R′ is hydrogen, alkyl or aryl, and R″ is alkyl, aryl, or aralkyl; $m$ is an integer from 2 to 3 and $n$ is 2 for $m = 2$ and 1 for $m = 3$.

The dialkyl and trialkyl tin sulfonamides are, depending on the sulfonamide and the dialkyl tin compound used, odorless and colorless solids or viscous liquids of very low vapor pressure and are stable against moisture and air. They are soluble, not only in hydrocarbons, esters, and similar conventional solvents but also in a number of high boiling esters used as plasticizers, such as dibutyl phthalate, di 2-ethyl hexyl phthalate, butoxyethyl adipate, and many others; therefore they can be readily incorporated in vinyl halide resins with which they are fully compatible, and to which they impart improved stability against discoloration by prolonged exposure to heat and light.

The organo-tin sulfonamides of the inventior may be prepared by causing an alkali or an alkaline earth metal derivative of a sulfonamide to react with an organo-like dihalide or an organo-tin monohalide. To carry out this reaction, the sulfonamide derivative is dispersed in an organic liquid, e. g. in an aromatic hydrocarbon which is a solvent for the dialkyl tin dihalide and the formed organo-tin compound but does not take part in the reaction.

After completion of the reaction, the precipitated alkali or alkaline earth metal halide is filtered off and the formed organo-tin sulfonamide is recovered from the solvent. The presence of water in this reaction is undesirable, as it will remove the halogen from the organo-tin halide and form an organo-tin oxide, which does not react.

Alkali metal derivatives of sulfonamides may be prepared by reacting the sulfonamide with metallic sodium or potassium, or with an alkoxide of a low molecular weight alcohol, such as methanol or ethanol, and by subsequently removing the alcohol though in some cases such removal is not necessary. Another method of preparation consists in subjecting the mixture of an alkali hydroxide and sulfonamide to azeotropic distillation.

Aliphatic or aromatic sulfonamides may be used such as methyl, ethyl, butyl, hexyl, dodecyl, benzene, p. toluol, alpha and beta naphthalene sulfonamide.

Also, alkylated aromatic sulfonamides may be used where one or more alkyl groups are attached to the aromatic nucleus, or aliphatic sulfonamides where one hydrogen of the amino group is replaced by an alkyl or aryl residue. Such sulfonamides result from the reaction between an aliphatic or aromatic sulfochloride and a primary amine. Examples are: N-ethyl methane sulfonamide, N-butyl hexane sulfonamide, N-butyl benzene sulfonamide, N-ethyl p. toluolsulfonamide, N-benzyl butyl benzene sulfonamide, N-isopropyl dodecyl benzene sulfonamide, and others. Dialkyl tin dihalides suitable for the reaction with the alkali or alkaline earth metal sulfonamides are for instance dimethyl, diethyl, dipropyl, dibutyl, diamyl, dioctyl, dilauryl tin dichloride or the corresponding dibromides.

The following examples will illustrate the preparation of the new compounds.

Example 1

68.4 g. of para-toluolsulfonamide, 16.4 g. of caustic soda dissolved in 16 cc. of water and 300 cc. of xylol were refluxed until the theoretical amount of water was separated; the batch was then cooled under rapid stirring to disperse the sodium derivative of the para-toluolsulfonamide, which is insoluble in xylol. 60.8 g. of dibutyl tin dichloride dissolved in 60 cc. of xylol were then slowly added at 0° to 5° C. and the batch was stirred until neutral. To facilitate the removal of the sodium chloride formed, the batch was heated to 60–70° C. and filtered by suction. A clear yellowish solution was obtained from which the xylol was removed by vacuum distillation. The product so obtained contained 19.34% of tin and consisted predominantly of the dibutyl di para-toluolsulfonamide tin of the formula:

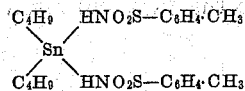

which theoretically requires 20.7 per cent of tin.

Example 2

64 g. of N-butyl benzenesulfonamide, 12.6 g. of caustic soda pellets dissolved in 12 cc. water and 1200 cc. xylol were refluxed and treated in a similar manner as in the preceding example.

The sodium derivative of the N-butyl benzene sulfonamide was then reacted with 45.6 g. of dibutyl tin dichloride; after the batch became neutral, the salt was filtered off and the solvent distilled at 130° C. at 8 mm. pressure. A clear yellowish oil was obtained which corresponded to the formula

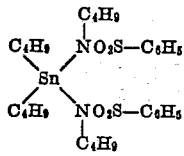

*Example 3*

33 g. of n-hexane sulfonamide were added to a solution of 4.6 g. of sodium metal in 160 cc. of absolute methanol under cooling at 10° C. To this solution 30.4 g. of dibutyl tin dichloride dissolved in 40 cc. of methanol was added at 5–10° C. and the mixture was stirred until it became neutral. The salt was filtered off and the methanol removed under reduced pressure. The product obtained was a viscous liquid and contained predominantly the dibutyl di n-hexane sulfonamide tin of the formula

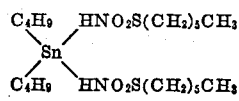

*Example 4*

In an analogous manner, as described in the first example, dibutyl tin di-benzene sulfonamide was prepared having the formula

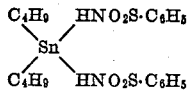

The crude product obtained after removing the solvent was purified by extraction with ether, then recrystallized from hot toluene. The product obtained was analyzed and contained:

|  | theory, percent | found, percent |
|---|---|---|
| Tin | 21.55 | 21.7 |
| Nitrogen | 5.13 | 4.98 |

The melting point was 135–137° C.

*Example 5*

The sodium derivative of N-ethyl p-toluolsulfonamide, prepared by an azeotropic distillation of 39.8 g. N-ethyl p-toluolsulfonamide with 8 g. of sodium hydroxide in 200 cc. xylol was reacted under cooling with 65 g. of tributyl tin monochloride until the reaction became neutral. After filtering off the salt formed in the reaction, the solvent was removed under reduced pressure and the liquid tin derivative fractionated. The fraction boiling at 200° C. at 1.5 mm. was a clear colorless liquid which on analysis gave the following results:

|  | found, percent | theory, percent |
|---|---|---|
| Sn | 24.18 | 24.3 |
| N | 2.80 | 2.87 |

It corresponded to the formula

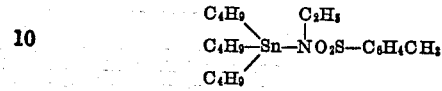

In the examples, we have shown the preparation of alkyl tin sulfonamides because the alkyl tin halides used as starting material are more readily available in commerce than the corresponding aryl tin halides. We have found, however, that aryl tin sulfonamides, such as di or tri phenyl, benzyl, tolyl, xylyl, and similar sulfonamides can be prepared in the same way as the alkyl tin sulfonamides.

Though we have herein set forth specific embodiments of our invention, it is not our intention to be limited thereto. To those skilled in the art there will be apparent many obvious variations and modifications such as the variations of quantities used and a substitution of equivalent materials that do not depart from the scope of our invention as set forth in the appended claims.

What we claim is:

1. An organo-tin sulfonamide useful as a stabilizer for vinyl halide resins, of the formula $R_mSn(R'NO_2SR'')_n$, wherein the tin atom is directly connected to the nitrogen atom of the sulfonamido group and R represents an alkyl radical having 1 to 12 carbon atoms, R' is a member selected from the group consisting of hydrogen, alkyl, and aryl, R'' is a member of the group consisting of alkyl, aryl, and aralkyl, and wherein $m+n$ is 4, $m$ being an integer from 2 to 3.

2. A dialkyl tin sulfonamide useful as a stabilizer for vinyl halide resins, of the formula $R_2Sn(R'NO_2SR'')_2$, wherein R represents an alkyl radical having 1 to 12 carbon atoms, R' is a member selected from the group consisting of hydrogen, alkyl and aryl, and R'' is a member of the group consisting of alkyl, aryl, and aralkyl.

GERRY P. MACK.
EMERY PARKER.

REFERENCES CITED

The following references are of record in the file of this patent:

UNITED STATES PATENTS

| Number | Name | Date |
|---|---|---|
| 2,135,553 | Andersen | Nov. 8, 1938 |
| 2,452,595 | Mowery, Jr. | Nov. 2, 1948 |

OTHER REFERENCES

McCombie et al., Nature, vol. 159, #4041, April 12, 1947, pages 491–494.